(12) United States Patent
Blazek

(10) Patent No.: US 9,727,354 B2
(45) Date of Patent: Aug. 8, 2017

(54) SYSTEM AND METHODS FOR LOADING AN APPLICATION AND ITS MODULES IN A CLIENT DEVICE

(71) Applicant: Lexmark International Technology Sarl, Genève (CH)

(72) Inventor: Shane Evan Blazek, Shawnee, KS (US)

(73) Assignee: KOFAX INTERNATIONAL SWITZERLAND SARL, Geneva (CH)

(*) Notice: Subject to any disclaimer, the term of this patent is extended or adjusted under 35 U.S.C. 154(b) by 0 days.

(21) Appl. No.: 14/268,646

(22) Filed: May 2, 2014

(65) Prior Publication Data

US 2015/0317171 A1    Nov. 5, 2015

(51) Int. Cl.
| | |
|---|---|
| *G06F 9/44* | (2006.01) |
| *G06F 9/445* | (2006.01) |
| *G06F 17/30* | (2006.01) |
| *G06F 3/0482* | (2013.01) |
| *G06F 3/0481* | (2013.01) |
| *G06F 3/0484* | (2013.01) |
| *H04L 29/06* | (2006.01) |

(52) U.S. Cl.
CPC ........ *G06F 9/44521* (2013.01); *G06F 3/0482* (2013.01); *G06F 3/04817* (2013.01); *G06F 3/04842* (2013.01); *G06F 8/70* (2013.01); *G06F 17/30887* (2013.01); *H04L 67/42* (2013.01); *G06F 8/60* (2013.01); *G06F 9/445* (2013.01); *G06F 9/4443* (2013.01); *G06F 9/44526* (2013.01)

(58) Field of Classification Search
CPC ......... G06F 8/20–8/78; G06F 3/048–3/04897; G06F 9/44–9/5094
See application file for complete search history.

(56) References Cited

U.S. PATENT DOCUMENTS

| | | | | |
|---|---|---|---|---|
| 7,073,134 | B1 * | 7/2006 | Ogami | G06F 8/34 715/719 |
| 7,926,047 | B2 * | 4/2011 | Drepper | G06F 9/45525 717/127 |
| 8,392,877 | B1 * | 3/2013 | Chiluvuri | G06F 9/44 717/106 |
| 8,656,297 | B2 | 2/2014 | Koenig et al. | |
| 8,719,781 | B2 * | 5/2014 | Agovic | G06F 8/76 717/106 |
| 9,088,414 | B2 | 7/2015 | Williams, III et al. | |

(Continued)

OTHER PUBLICATIONS

Carrozzino, Marcello et al., "Lowering the Development Time of Multimodal Interactive Application: The Real-life Experience of the XVR Project," 2005, pp. 270-273.*

(Continued)

*Primary Examiner* — Thuy Dao
*Assistant Examiner* — Christopher Franco
(74) *Attorney, Agent, or Firm* — Zilka-Kotab, P.C.

(57) ABSTRACT

A method of dynamically loading a module into an application that includes receiving from a configuration file a list of available modules; retrieving for each available module, a mapping of a URL pattern to a callback function associated with the available module; and adding the mapping of the URL pattern to a collection of URL patterns associated with the application.

19 Claims, 3 Drawing Sheets

(56) References Cited

U.S. PATENT DOCUMENTS

| | | | | |
|---|---|---|---|---|
| 2005/0204336 | A1* | 9/2005 | Liu | G06F 8/34 717/113 |
| 2006/0041879 | A1* | 2/2006 | Bower | G06F 9/4443 717/162 |
| 2008/0092057 | A1* | 4/2008 | Monson | G06F 9/4443 715/744 |
| 2008/0127154 | A1* | 5/2008 | Drepper | G06F 9/45525 717/162 |
| 2008/0235710 | A1* | 9/2008 | Challenger | G06F 9/5027 719/316 |
| 2009/0249249 | A1* | 10/2009 | Glein | G06F 8/38 715/810 |
| 2010/0235377 | A1* | 9/2010 | Kuryata | G06F 9/45516 717/140 |
| 2010/0306668 | A1 | 12/2010 | Williams, III et al. | |
| 2011/0029949 | A1* | 2/2011 | Adams | G06F 8/38 717/109 |
| 2011/0246922 | A1 | 10/2011 | Koenig et al. | |
| 2011/0252402 | A1* | 10/2011 | Sanoy | G06F 3/04845 717/120 |
| 2012/0204167 | A1* | 8/2012 | Yoshida | G06F 8/65 717/170 |
| 2013/0145348 | A1* | 6/2013 | Agovic | G06F 8/30 717/120 |
| 2013/0152064 | A1* | 6/2013 | Gagliardi | G06F 9/44521 717/166 |
| 2013/0198603 | A1* | 8/2013 | Gokhman | G06F 17/3089 715/234 |
| 2014/0026113 | A1* | 1/2014 | Farooqi | G06F 8/36 717/107 |
| 2014/0237456 | A1* | 8/2014 | Monclus | G06F 8/41 717/140 |
| 2014/0372998 | A1* | 12/2014 | Salameh | G06F 8/65 717/169 |
| 2015/0317042 | A1 | 11/2015 | Blazek | |

OTHER PUBLICATIONS

Poeplau, Sebastian et al., "Execute This! Analyzing Unsafe and Malicious Dynamic Code Loading in Android Applications," Feb. 2014, pp. 1-16.*

Mayer, Johannes et al., "Lightweight Plug-In-Based Application Development," 2002, pp. 87-102.*

Rellermeyer, Jan S. et al., "R-OSGi: Distributed Applications Through Software Modularization," 2007, pp. 1-20.*

Mukherjee, Joy et al., "Develop Once Deploy Anywhere Achieving Adaptivity with a Runtime Linker/Loader Framework," 2005, pp. 1-6.*

Brunink, Marc et al., "Aaron: An Adaptable Execution Environment," 2011, pp. 411-421.*

Non-Final Office Action from U.S. Appl. No. 14/587,475, dated Sep. 10, 2015.

Final Office Action from U.S. Appl. No. 14/587,475, dated May 23, 2016.

Non-Final Office Action from U.S. Appl. No. 14/587,475, dated Jan. 6, 2017.

Blazek, S., U.S. Appl. No. 14/587,475, filed Dec. 31, 2014.

Notice of Allowance from U.S. Appl. No. 14/587,475, dated Apr. 25, 2017.

* cited by examiner

SYSTEM AND METHODS FOR LOADING AN APPLICATION AND ITS MODULES IN A CLIENT DEVICE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates generally to a system and methods for creating and loading an application, more particularly, creating and loading an application and its associated modules.

2. Description of the Related Art

When developing multi-functional applications such as, for example, a web application, it is often desirable to delegate and divide the development of the various functionalities into projects for creation by one or more development groups within and/or outside of the company. By breaking down the application into multiple projects, different development groups can work in parallel, thereby resulting in the shortening of the development time of the application. This programming technique is often referred to as modular programming wherein the different functionalities are developed as separate or independent modules.

In typical applications, all of the functionality of the application is defined within its set of components, and adding any new functionality to the application requires the code of these components to be modified. A few drawbacks with this approach are that new functionality cannot be easily added at any time, and adding a new functionality requires access to and modification of the code of these components. When a developer delivers the application to a customer, the customer may not be able to easily add a new functionality without extensive modification, programming or recompilation to the code of the already-developed application.

Accordingly, there exists a need for a method of adding a new module to an existing application without having to modify any of the existing modules and/or the framework of the application to which the new module will be loaded. There also exists a need for a method of dynamically loading one or more modules to the application when the user accesses or navigates to the application.

SUMMARY

A system capable of and methods of dynamically loading a module into an application are disclosed. One example method of dynamically loading a module into an application includes receiving from a configuration file a list of available modules; retrieving for each available module, a mapping of a URL pattern to a callback function associated with the available module; and adding the mapping of the URL pattern to a collection of URL patterns associated with the application. The example method may further include retrieving at least one of a caption and an image associated with each available module.

A second example method of dynamically loading one or more modules into an application includes, based upon an identifier, determining the one or more modules to be loaded into the application running on a client device; retrieving for each of the one or more modules, a mapping of a URL pattern to a callback function associated with the one or more modules; and adding the mapping of the URL pattern to a collection of URL patterns associated with the application. A user-selectable module list containing at least one of an image and caption associated with each of the loaded modules may then be displayed to the user. From the foregoing disclosure and the following detailed description of various example embodiments, it will be apparent to those skilled in the art that the present disclosure provides a significant advance in the art of loading modules in an application to dynamically create the application at runtime. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
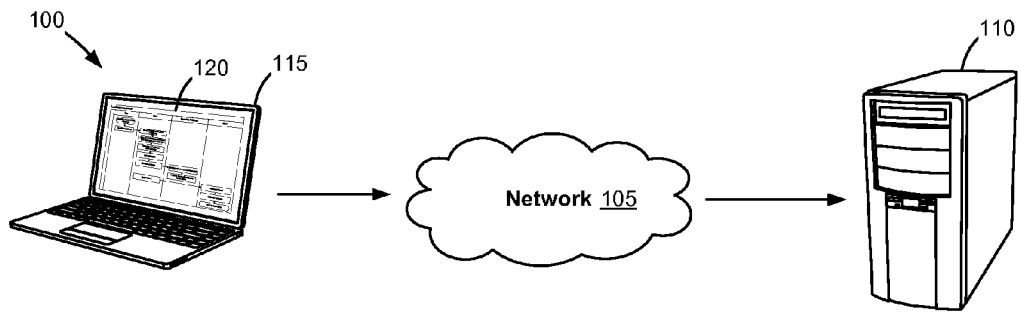
FIG. 1 shows one example embodiment of a system for loading one or more modules of an application to create a customized application for a user or group of users at runtime.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a system and methods for loading one or more modules of an application to create an application at runtime. The methods may include determining the modules to be loaded in the application and, for each of the modules determined to be loaded, retrieving information needed to initialize the modules. The information to be retrieved may include an image, such as an icon, and a caption representative of the module, a default location for accessing the module, and one or more URL routes for calling one or more functions of the module. An item for each of the modules may then be rendered in the application for use in accessing the corresponding module, and each of the one or more URL routes for each of the modules may then be added to a list of URL routes to be used by the application.

FIG. 1 shows one example embodiment of a system 100 for loading one or more modules of an application to create a customized application for a user or group of users at runtime. System 100 includes a network 105 and a server or server computer 110 communicatively connected to a client device 115 through network 105. Network 105 is any network capable of allowing communication between two or more computing systems, as discussed herein, and/or available or known at the time of filing, and/or as developed after the time of filing. For example, network 105 may be a communications network or network/communications network system such as, but not limited to, a peer-to-peer network, a hybrid peer-to-peer network, a Local Area Network (LAN), a Wide Area Network (WAN), a public network such as the Internet, a private network, a cellular network, or a combination of different network types. Network 105 may be wireless, wired, and/or a wireless and wired combination network.

Server 110 may be a computing device that hosts content for accessing by client device 115 through network 105. Examples of server 110 may include but are not limited to a personal computer, a server computer, a series of server computers, a mini computer, and a mainframe computer. Server 110 may also be a web server (or a series of web servers) that hosts web content such as, for example, files and data associated with the application and that provides the files when a user of client device 115 requests access to the files through the application.

Client device 115 may be any computing device capable of executing applications therein such as, for example, a personal computer, mobile phone, laptop or a tablet computer. Client device 115 may include a processor (not shown) and a computer-readable storage medium (not shown), such as a random access memory (RAM), coupled to the processor. The processor may execute computer-executable program instructions stored in the memory. Computer-executable program instructions may include a set of instructions for executing browser 120 such as, for example, a web browser for use in opening web applications.

Client device 115 accesses content from server 110 in order to load modules of an application at runtime. In one alternative example embodiment, the modules of the application may be stored in client device 115 such that in some example aspects, the method for creating an application does not need a connection to server 110 in order to load the modules. Browser 120 may be a web browser or any other similar program that accesses information from the World Wide Web, or from a remote computer, such as server 110. Browser 120 may be used by a user of client device 115 to open an application, such as, for example, a web application.

Figure 2:
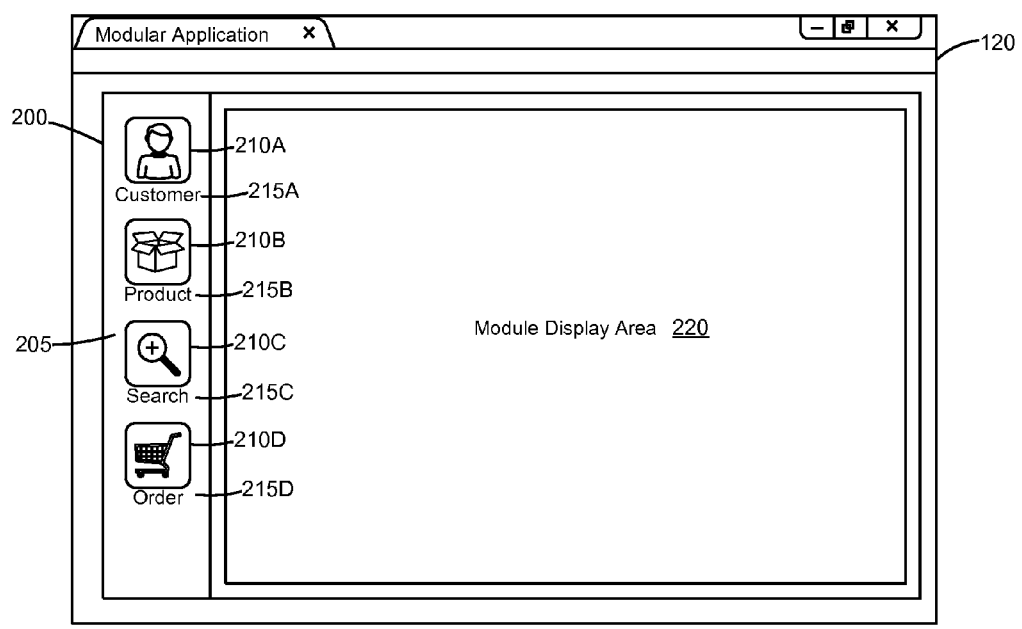
FIG. 2 shows one example modular application displayed in a browser of a client device.

FIG. 2 shows one example modular application or application 200 displayed in a browser 120 of client device 115. Application 200 may include a module list 205 displaying a list of module icons 210A-D and associated captions 215A-D and a module display area 220.

Application 200 may be any application that is comprised of a set of one or more functional units, commonly referred to as modules that are integrated to form application 200 to be accessed by the user using browser 120. The modules may be individually developed, tested and/or deployed and when called or integrated together during runtime may each encapsulate a portion of the overall functionality of application 200. The modules may each be abstractions for making software development easier or efficient to write and/or to maintain. In one example embodiment, the modules may be written with a specific implementation such as, for example, Javascript, HTML, CSS, and the like.

In one example embodiment, application 200 may contain varying modules based upon the preferences or functionality desired by a user of application 200. For example, a user may choose which one or more modules to include in his or her version of application 200. In one example embodiment, application 200 may be a shopping application for selling products, and the user may manage the shopping application and choose to include only modules Customer, Product, Search, and Order in his or her version of application 200. In another example embodiment, another user may manage a shopping application that sells products and provides services from one or more providers and will choose to include Customer, Product, Service, Provider, and Order in his or her version of application 200. In these example embodiments, application 200 may be a web-based application that is accessed by a user through browser 120. Application 200 may be any data management application or any other type of application as will be known in the art. It will also be appreciated that, in some example aspects, the modules forming application 200 may be pre-set or predetermined by the manufacturer and/or administrator of application 200.

With continued reference to FIG. 2, application 200 may include module list 205 that displays module icons 210A-D and associated captions 215A-D that are representative of the modules selected and desired by the user accessing application 200. Module list 205 may resemble at least one of a toolbar, a drop down list or menu, a grid of icons, or any other panel format that is able to display the icon and/or caption of each module that is loaded with application 200. In this illustrative example embodiment, the modules included in application 200 are the Customer, Product, Search, and Order modules corresponding to module icons 210A-D and their associated captions 215A-D, respectively.

Application 200 may also include a module display area 220. Module display area 220 may be a user interface (UI) of application 200 that displays the module interface of the currently selected module from module list 205. Module display area 220 may also display other pages of application 200, such as, for example, the home page; the site map; a list of users, salespersons, invoices or accounts; the details of a contract, user, salesperson, customer or contact; the details of an invoice or account; and images or photos, as will be known in the art.

In one example embodiment, the module list 205 and module display area 220 may be part of a shell (not shown). The shell may be a UI component responsible for dynamically loading and displaying the list of modules and their corresponding interfaces. The shell may modify the UI dynamically upon the loading of the modules based on the information contained in the modules corresponding to the specified module format.

When application 200 is requested by a user through browser 120, an index file, such as an index.html or index.htm file, of application 200 is accessed. The index file may then load or initialize a shell, which then configures or initializes the rest of application 200. The shell may be a framework or handler that coordinates the different modules for loading and accessing by the user while navigating application 200. The shell may load a configuration file or one or more executable instructions for creating and/or customizing application 200. Example instructions may include, but are not limited to, obtaining the list of modules to be loaded, determining the initial modules to be loaded in module list 205, determining module dependencies, and/or performing any module-specific initialization. One example module-specific initialization may be obtaining a component, such as an icon or caption, associated with the module and/or creating a toolbar item for the module.

In one alternative example embodiment, the shell may also include other components of application 200 such as, for example, an application logo, a company logo, a user menu, a settings dialog, an about dialog, among others.

In one example embodiment, each of the modules in application 200 may follow a module format to be read by the shell. In order for the shell to load the modules dynamically to create application 200, all of the modules for application 200 may be required to follow the module format during their development. In this example embodiment, the shell does not have to be pre-configured with the modules, or to know about the modules to be loaded until after application is launched. Dynamically loading and creating an application having modules that follow the format allows new modules to be coded and deployed after the shell is coded and/or deployed without changing the code for the shell.

The module format may require the modules to specify at least the following information: a name, an icon such as module icons 210A-D, captions such as captions 215A-D, a default URL to be used to access the module, a module element containing the files for rendering the module, and a mapping of URL patterns to callback functions for the module, where each URL pattern is mapped to a single callback function to form a URL pattern-callback function pair. The collection of URL patterns may be any type of data structure. For example, the collection of URL patterns may be a list, a linked list, a hash, an array, and the like. In some example aspects, where the module performs a single function, there is only a single URL pattern-callback function pair. Other information may also be included in the module format, as will be known by those skilled in the art.

Module icons 210A-D may each be a graphical object representative of its corresponding module while captions 215A-D may be explanatory text that each describes its corresponding module. The default URL of the module may be the URL used to access an initial rendered state or user interface element of the module such as, for example, an index, initial or default entry page, default URL or home page of the module.

The module element of each of the modules may include a rendered state of the module or the output HTML of the module. If the module has not been previously accessed by the user, the module element may be the index of the module. In some example embodiments, if the module has been previously accessed by the user, the element may be the last rendered state of the module such as, for example, the last page of the module that was displayed in module display area 220. It will be appreciated by those skilled in the art that the module element may pre-set or pre-designated to a particular page or state, regardless of whether the user previously accessed the module.

The mapping of URL patterns to one or more callbacks refer to a list of routes that may be used to call registered callback functions that render a user interface. For illustrative purposes, Table 1 shows an example list of routes or URL patterns for the Customer module and an explanation of the functions of each route:

TABLE 1

Example URL Patterns and Associated Functions

| Route | Function |
|---|---|
| /customers | Shows a list of customers |

TABLE 1-continued

Example URL Patterns and Associated Functions

| Route | Function |
|---|---|
| /customers/:id | Shows the details of a specific customer, specified by the ID |
| /customers/:id/documents | Shows a list of documents available for the customer |
| /customers/:id/documents/:documentId | Shows the details of a specific document specified by the document id, for a specific customer, specified by the id. |
| /customers/:id/documents/:documentID/pages/:pageId | Shows a specific page on a specific document for the customer |

For example, when a user navigates to an example URL http://example/customers/1234 or http://example/customers/9876, the details of Customer ID 1234 or 9876, respectively, will be retrieved, rendered and displayed in module display area 220. The module may determine from which storage location the details are retrieved. For example, the details may be retrieved from a server or a database. If the user further navigates to another example URL: http://example/customers/1234/documents/abcd, the document abcd that belongs to customer 1234 is retrieved, rendered and displayed in module display area 220.

The routes may be URL patterns to be matched by the shell. Whenever the user navigates to a current URL in browser 120, the shell looks through all the defined URL patterns of the module to determine if the current URL matches a URL that is defined by any of the loaded modules. Upon a positive determination, a callback function mapped to the route may be called by the shell. Other methods of URL routing which enables application 200 to use URL patterns to retrieve data and invoke callback functions will be known to those skilled in the art.

In one example embodiment of the present disclosure, each of the modules is allowed to define its own set of routes. When a module is loaded, the shell retrieves all of the defined routes from the module and dynamically adds them to a list of routes that the shell periodically checks when a new URL is navigated to. In one example embodiment, the callbacks are defined in the module such that one module may not be aware about the callbacks or routes contained in another module.

Because of the independence in developing each of the modules in the example embodiment, with each module having its own set of routes and URL patterns, developers may add a new module to application 200 at any time without changing the code of any other elements of application 200, such as those of the shell or of the other existing modules. When a new module is installed, the shell of application 200 automatically retrieves the new URL routes available and specified by the module during installation or loading. This allows the developers to add new functionality to application 200 at any time without affecting the development time of any other module.

Allowing the module to define and maintain its own set of routes also allows the customer, or another company, to write a module without any access to the code of the modules created by another developer and, subsequently, add the newly-developed module or functionality to application 200.

Figure 3:
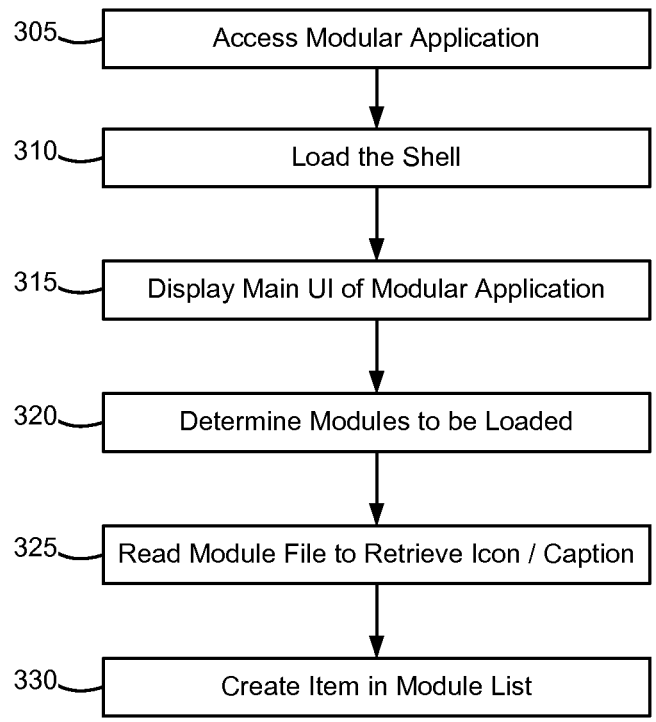
FIG. 3 is one example flowchart of a method for loading one or more modules of the example application of FIG. 2 to create the application at runtime, according to one example embodiment.

FIG. 3 shows one example flowchart of a method 300 for loading one or more modules of application 200 to create the application at runtime, according to one example embodiment. Method 300 may be performed using client device 115 that accesses application 200 through browser 120. Method 300 loads application 200 by loading the shell of application 200, which then handles the rest of the application initialization process such as determining the modules to be loaded, retrieving initialization details of the modules, and preparing module list 205 of application 200.

At block 305, application 200 may be accessed by a user through browser 120. The user may access application 200 by entering the URL referencing application 200 on the address bar (not shown) of browser 120. Browser 120 then uses the URL to request a page or file from server 110 associated the URL and requests or downloads the page through network 105 and into client device 115 for displaying on browser 120. In one alternative example embodiment, browser 120 may retrieve the page from client device 115 in a system wherein the module files are saved in client device 115 instead of on server 110.

In some example embodiments, the user may also click a link that redirects browser 120 to the URL of application 200 and loads the elements of application 200 from such link. Other means of accessing application 200 such as, for example, by opening a computer program installed in client device 115 that is designed to access application 200 through server 110, will be known in the art.

For example, the user may type http://example in the address bar of browser 120, which is the assigned URL for accessing application 200. In some other example aspects, the user may click a hyperlink to http://example provided to the user by other means such as, for example, through an e-mail sent to the user.

At block 310, the shell is loaded in browser 120. The shell may be loaded when application 200 is successfully accessed or launched in browser 120. Loading the shell after application 200 has been requested by the user allows application 200, through the shell, to initialize or set up its modules and the rest of application 200 to form a cohesive interface to the user.

At block 315, the shell may load and display a main UI of application 200 in browser 120. The main UI may be an index file or may be loaded by an index file. An index file is typically the first file that is loaded when an application is requested such as, for example, an index.html file that is loaded when a web application is requested from browser 120. The index file may also be referred to as the home page of application 200. The main UI may include module list 205 and module display area 220 (shown in FIG. 2).

At block 320, the shell may determine which modules are to be loaded. Determining the modules to be loaded may include retrieving a list of modules or other identifier associated with each module to load from server 110. In some example aspects, determining the modules to be loaded may also include determining an identifier. Determining the modules to be loaded may also include confirming or verifying which modules are to be associated with the identifier.

As discussed above, differing modules may be loaded for each application 200, depending upon one or more variables such as, for example, an identifier associated with the user or device accessing application 200.

In some example embodiments, the identifier may be a user or group identifier. In one example aspect, the identifier of the user may be determined by a request of credentials for the user prior to loading the shell. For example, the identifier may be determined by a single sign-on system, Active Directory by Microsoft or other identity provider. In other example aspects, the shell may first be loaded and the user credentials received from a user, before loading the modules associated with the user credentials. In such example aspects, the user credentials may be retrieved from a login view that may be part of the shell. In yet other example aspects, the user credentials may be received from a designated storage location (e.g., USB or flash drive).

For example, the shell may determine that application 200 being accessed by the user having identifier 123123 may include the modules Customer, Product, Search and Order.

In other example embodiments, other identifiers may be used in addition to or in lieu of user credentials to verify which modules are to be loaded on browser 120 may. Such other identifiers may include an IP address of client device 115, the type of client device (e.g., phone or desktop computer) accessing application 200 or a date/time stamp.

In still other example embodiments, the identifier may be a state of the application. For example, if the module to be loaded performs the function of displaying the tasks to be completed, and there are no outstanding tasks, the module may not be loaded.

In yet other example embodiments, the identifier may be a user's preferences, privileges, or an identifier of a group to which the user belongs. For example, a user may choose to hide a module and prevent its loading or a system administrator may have the right to load a module but a salesperson may not.

At block 325, a module file may be read for each of the modules to be loaded as part of the initialization of application 200 in order to retrieve information about the modules. As discussed above, the module file may contain information such as, for example, a name, icon, caption, and/or mapping of URL patterns to callbacks or routes in a specific format, which the shell uses to dynamically load the module to create application 200.

The module file may also include information used for initializing the corresponding module. For example, the module file may include or may contain one or more instructions to access an icon associated with the module such as, for example, an image that will be rendered and displayed in module list 205 of application 200 to represent the loaded module. The module file may also include a caption or a label associated with the module that may be displayed in module list 205. In some example embodiments, information used for initializing the modules may come from multiple sources. For example, in some aspects, the caption associated with the module may be included in the module file while the icon may be retrieved from server 110.

In yet other example embodiments, the icon and the caption may be generated by the module such as, for example, when the module does not contain a static (e.g., coded) caption but instead contains a function that generates the caption based on one or more variables (e.g., time of the year, user accessing the module, etc.). Other methods of generating and/or retrieving the icon and/or the caption will be known in the art.

Other information related to each of the modules to be loaded, rendered and displayed in browser 120 may also be retrieved from the module file and executed by the shell such as, for example, routes, initialization information, and/or module dependencies, among others.

At block 330, an item in module list 205 may be created by the shell for each loaded module. An item may refer to an instance of the list item rendered and displayed in module list 205. As shown in FIG. 2, each of the icon/caption pairs in module list 205 corresponds to one item created and loaded in module list 205. For example, once the shell is given the list of the modules to be loaded (e.g., Customer, Product, Search, and Order), the shell reads the module file associated with each of the Customer, Product, Search, and Order modules and initializes the modules. Module initialization may include creating an item for each of the Customer, Product, Search, and Order modules in module list 205. Initializing the modules may be performed by reading the module file that contains information in the specified module format.

Figure 4:
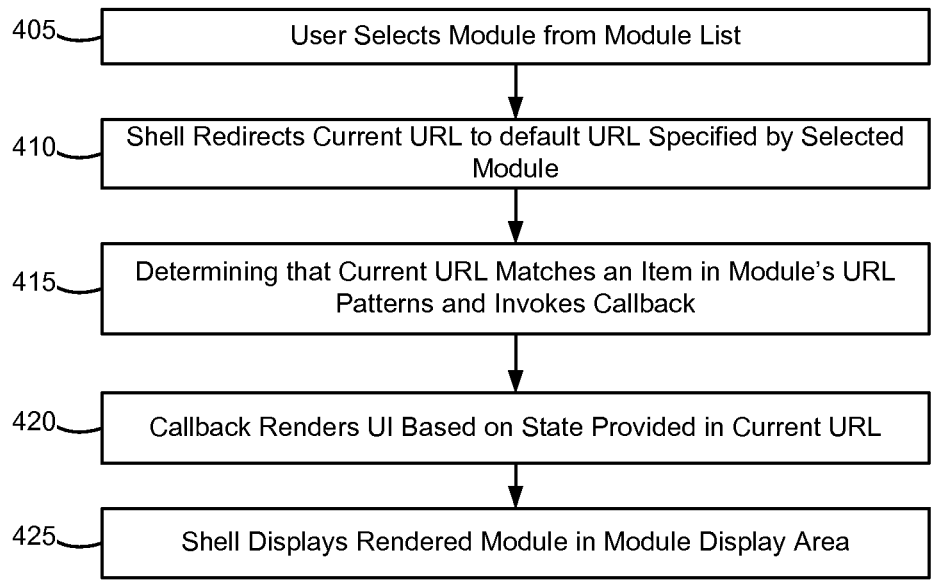
FIG. 4 is one example flowchart of a method for opening a module in the example application of FIG. 2 that has been not been previously accessed.

FIG. 4 shows one example flowchart of a method 400 for opening or accessing a module in application 200 that has not been previously accessed. In this example embodiment, the user opens the module identified by its icon and/or caption and displayed in module list 205 by selecting the module from module list 205. Method 400 may be performed by the shell of application 200.

At block 405, a user of application 200 activates or accesses one or more functionalities of a module by selecting it from module list 205. Selecting a module may include raising an event associated with the icon and/or caption of the module. For example, selecting a module may include, but is not limited to, clicking on the icon and/or caption or choosing the desired module from a selection list presented in another format, such as, for example, a drop down menu, radial button list, check box list or hyperlink list. In some example aspects, selecting a module may include navigating to a URL that matches a route associated with the desired module.

For example, the user may wish to access the Customer module to check a profile of a customer registered in application 200. The user may access the Customer module by clicking Customer icon 210A and/or Customer caption 215A which references a URL designated to the Customer module.

At block 410, upon receiving the event, the shell may redirect the URL that is currently displayed in module display area 220 to a URL associated with the selected module. The current URL may refer to the URL in the address bar of browser 120, as is known in the art. In some example aspects, the current URL may not be displayed in the address bar and may instead be a hidden variable such as, for example, when browser 120 is embedded in another application.

Upon the current URL changing, the shell then determines if the new current URL matches an item in the module's URL patterns. Upon a positive determination or match, the shell may invoke a callback that is mapped to the matched URL pattern (block 415).

For example, the URL pattern /customers/:customerId is associated with the callback function showSingleCustomer (customerId) which shows a profile of a single customer having a specific customer ID. When the user navigates to http://example/customers/9876, the shell determines which URL pattern the current URL matches. Upon determining that the current URL matches /customer/:customerId, the shell calls the associated callback function showSingleCustomer(customerId), and passes the customerId variable from the current URL (e.g., 9876) to the callback function. The callback function may use the passed customerId variable to perform the request.

At block 420, the module's callback function renders its user interface, which is the representation of the module, based on the state provided in the current URL. For example, the module user interface may be a document object model (DOM) element, user control, image, page, or other visual representation.

At block 425, the shell displays the module's user interface in module display area 220 to the user. The rendered and displayed state of the module is now ready for use by the user.

For example, once the callback function showSingleCustomer(customerId) receives the customerId, the module retrieves the profile corresponding to the customerId (e.g., 9876) and then renders a user interface corresponding to the profile of Customer 9876 in module display area 220. The rendered profile of Customer 9876 is placed in module display area 200 and is then ready for viewing and use by the user.

In some example embodiments, the shell may also determine the module that the route belongs to so that the shell may highlight or otherwise indicate to the user that the module is the currently selected module or the currently navigated module. Since each route is specified by a module, whenever a matching route is found, the shell can identify which module defined that route. The shell may then indicate or otherwise identify the currently selected module to the user by highlighting the selected module on a toolbar, for example.

In other example embodiments of loading a module into application 200, the module may be opened via a direct URL instead of via module list 205. In such example embodiments, the module may be activated by the user navigating directly to a URL location that can be handled by a module. The URL may be associated with the module as is typical in web applications wherein at least one or more functions or features of the module is assigned a URL that automatically redirects the display to the activated function or feature of the specific module selected by the user. When the URL is entered by the user, the shell determines which of the modules the current URL matches an item in the module's URL patterns and invokes the callback. The invoked callback then renders its user interface based on the state provided in the current URL location and provides the rendered user interface to the shell. The shell displays the user interface in module display area 220. In some example aspects, the shell may also indicate the selected module in module list 205.

After the shell loads, renders and displays the requested module in browser 120, the user may navigate within the displayed module user interface through browser 120 and access one or more functions of the module. As the user navigates within the displayed module user interface, updates to the module interface displayed may be triggered in module display area 220. The updates may include dynamically changing the page being displayed in module display area 220 in response to the event triggered by the user navigation.

For example, the Customer module may include one or more links that reference one or more pages associated with the Customer module such as, for example, one or more Customer profile pages. The shell may render and display the Customer profile pages as they are accessed by the user via clicking URLs of the profile pages, as will be known in the art.

In some example embodiments, the user may also navigate from the displayed module to another module. For example, while navigating the Customer module, the user may access the Product module by clicking the Product icon 210B and/or Product caption 215B which triggers the shell to access the URL of the Product module.

In some example aspects, a user may wish to revisit a previously viewed record or page. To assist the user in navigating or accessing previously viewed or accessed records or data more easily or more efficiently, the shell may save the last rendered state or page of the previously loaded module before navigating to or accessing the new module. The saving of the last rendered state in a repository may also help in serving up future requests for that module faster. In some example aspects, the last rendered state may contain values or dependencies that may have been initialized during the user's previous access of such module. In other example aspects, loading the saved element may also eliminate the need for module data to be recomputed or fetched from its original storage location such as in the case of accessing the module for the first time. Thus, retrieving and loading the last rendered state of the module from the repository may, therefore, be comparatively faster than loading the module and re-initializing the module.

For example, when the user selects the Customer module again, the user may not want to have to find, search for or otherwise locate the previously-viewed customer again. By saving the last rendered state of the Customer module, the shell is able to display the data associated with the most recent customer accessed by the user when the user selects or returns to the Customer module again.

Figure 5:
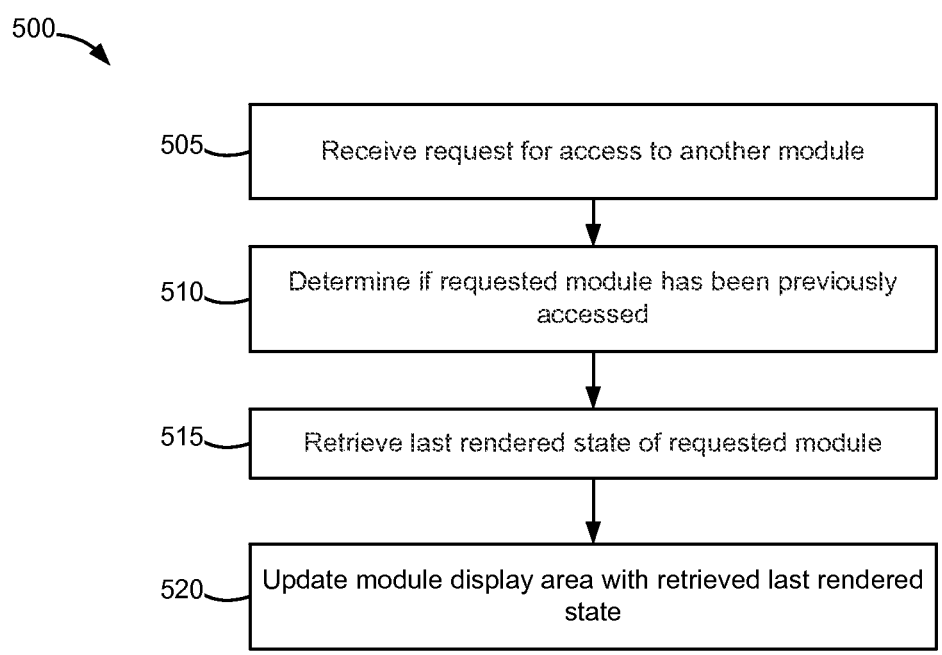
FIG. 5 is one example flowchart of a method for opening a module that has been previously navigated to by a user of the example application of FIG. 2 that has its last rendered state saved by the shell.

FIG. 5 shows one example flowchart of a method for opening or accessing a module that has been previously navigated to by a user of application 200 that has its last rendered page or state saved by the shell. The shell may listen for events in application 200 that indicate that the user has selected a module either from module list 205 or from a direct URL, then determine if the user has selected a module that has been previously navigated to or accessed. If the user has selected a module that has not been previously accessed, the selected module may be loaded using example method 400, as discussed above.

At block 505, the shell receives a request for access to another module from the user. The request may be triggered by the user clicking a URL referencing another module, as will be known in the art. For example, requesting a module may include, but is not limited to, clicking on the icon and/or caption or choosing the desired module from a selection list presented in another format, such as, for example, a drop down menu, radial button list, check box list or hyperlink list. In some example aspects, requesting a module may include navigating to a URL that matches a route associated with the desired module.

At block 510, the shell determines if the requested module has been previously accessed. The request may be triggered by the user clicking a URL referencing another module, as will be known in the art.

If the requested module was previously accessed or navigated to by the user, the shell may retrieve the last rendered state of the requested module (at block 515) from a repository in client device 115, such as in a cache or other memory, or a repository stored remotely, such as in a database or other remote cache.

The shell may then update module display area 215 with the retrieved last rendered state (at block 520). Updating module display area 215 may include the shell saving the currently rendered state of the currently displayed module prior to replacing the current module user interface with the last rendered state of the requested module in module display area 220.

For example, referring to FIG. 2, after browsing through the Product module, the user may re-access Customer module by clicking Customer icon 210A or caption 215A. The shell determines that the user has previously accessed the Customer module and saved the last rendered state for the Customer module. The shell then retrieves and displays the last rendered state of the Customer module updates module display area 220.

In some alternate example embodiments, updated module display area 220 may display the user interface of the requested module as if the requested module had never been previously accessed. The method of displaying such user interface may be accomplished using example method 400 of FIG. 4 starting at block 410.

It will be understood that the example embodiments described herein are illustrative and should not be considered limiting. It will be appreciated that the actions described and shown in the example flowcharts may be carried out or performed in any suitable order. It will also be appreciated that not all of the actions described in FIGS. 3-5 need to be performed in accordance with the example embodiments of the disclosure and/or additional actions may be performed in accordance with other example embodiments of the disclosure.

Many modifications and other example embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A method of dynamically loading a module into an application, comprising:
    receiving a request from a user to access the application; and
    upon receiving the request, creating the application at runtime by:
        receiving from a configuration file a list of available modules to be loaded to the application upon execution of the application; and
        loading each available module in the list of available modules into the application by:
            retrieving a mapping of a Uniform Resource Locator (URL) pattern to a callback function associated with each of the available modules; and
            adding the mapping of the URL pattern to a collection of URL patterns associated with the application.

2. The method of claim 1, further comprising retrieving at least one of a caption and an image associated with each available module.

3. The method of claim 1, further comprising displaying in a user interface a component linking to each available module.

4. The method of claim 1, further comprising displaying a module interface associated with one of the available modules.

5. The method of claim 1, wherein a location of the module is a location of an initial user interface element of the module.

6. The method of claim 1, wherein the collection of URL patterns is a data structure.

7. The method of claim 6, wherein the data structure is a hash.

8. A method for dynamically loading one or more modules into an application, comprising:
    receiving a request from a user to run the application; and
    upon receiving the request, initializing the application at runtime by:
        determining, based upon an identifier, the one or more modules to be loaded into the application running on a client device; and
        loading each of the one or more modules into the application by:
            retrieving a mapping of a Uniform Resource Locator (URL) pattern to a callback function associated with the one or more modules; and
            adding the mapping of the URL pattern to a collection of URL patterns associated with the application.

9. The method of claim 8, further comprising requesting the identifier from the user.

10. The method of claim 8, further comprising displaying a user-selectable module list to the user, the user-selectable module list containing at least one of an image and caption associated with each of the loaded modules.

11. The method of claim 10, wherein the user-selectable module list is a drop down menu.

12. The method of claim 8, further comprising displaying a module interface associated with at least one of the loaded modules.

13. The method of claim 12, wherein the displayed module interface is an initial rendered state of the at least one of the loaded modules.

14. The method of claim 12, wherein the displayed module interface is a last rendered state of the at least one of the loaded modules.

15. The method of claim 8, further comprising retrieving an icon for each of the one or more modules.

16. The method of claim 8, wherein the determining the one or more modules to be loaded for the application is performed when the application is requested by the user.

17. The method of claim 8, wherein the identifier identifies the device.

18. The method of claim 8, wherein the identifier identifies the user.

19. A method for accessing modules in an application, comprising:
    while executing a first module, receiving, from a user, a request to execute a second module;
    determining if the second module has been previously executed by the user;
    if the second module is determined to have been previously executed by the user, retrieving a last rendered state of the second module, the last rendered state referring to a last state of the second module displayed to the user;
    updating a user interface with the last rendered state of the second module;
    receiving from the user a request for access to the first module while executing the second module;
    saving a most recent rendered state of second module;
    retrieving a last rendered state of the first module; and
    updating the user interface with the last rendered state of the first module.

* * * * *